United States Patent
Sakhnini et al.

(10) Patent No.: US 11,576,216 B2
(45) Date of Patent: Feb. 7, 2023

(54) SR/PRACH INDICATING DG OR CG REQUEST

(71) Applicant: QUALCOMM Incorporated, San Diego, CA (US)

(72) Inventors: Iyab Issam Sakhnini, San Diego, CA (US); Tao Luo, San Diego, CA (US); Olufunmilola Omolade Awoniyi-Oteri, San Diego, CA (US); Jelena Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/458,157

(22) Filed: Aug. 26, 2021

(65) Prior Publication Data

US 2022/0095390 A1 Mar. 24, 2022

Related U.S. Application Data

(60) Provisional application No. 63/082,396, filed on Sep. 23, 2020.

(51) Int. Cl.
*H04W 74/08* (2009.01)
*H04W 74/00* (2009.01)
*H04W 72/14* (2009.01)
*H04W 72/12* (2009.01)

(52) U.S. Cl.
CPC .... *H04W 74/0841* (2013.01); *H04W 72/1263* (2013.01); *H04W 72/1284* (2013.01); *H04W 72/1294* (2013.01); *H04W 72/14* (2013.01); *H04W 74/004* (2013.01)

(58) Field of Classification Search
None
See application file for complete search history.

(56) References Cited

U.S. PATENT DOCUMENTS

| 11,166,302 | B2 * | 11/2021 | Kim | H04W 72/1289 |
| 2020/0383095 | A1 * | 12/2020 | Moon | H04L 5/0094 |
| 2021/0329658 | A1 * | 10/2021 | Li | H04W 72/1284 |
| 2022/0046730 | A1 * | 2/2022 | Peng | H04W 76/11 |

* cited by examiner

*Primary Examiner* — Jutai Kao
(74) *Attorney, Agent, or Firm* — Procopio, Cory, Hargreaves & Savitch LLP

(57) ABSTRACT

To facilitate requesting DG or CG, methods, apparatuses, and computer program products are provided. An example method at a UE includes transmitting, to a base station, an SR or a PRACH associated with a scheduling type indication that indicates a DG or a CG. The example further includes receiving a response from the base station.

36 Claims, 10 Drawing Sheets

SR/PRACH INDICATING DG OR CG REQUEST

CROSS REFERENCE TO RELATED APPLICATION(S)

This application claims the benefit of and priority to U.S. Provisional Application Ser. No. 63/082,396, entitled "SR/PRACH INDICATING DG OR CG REQUEST" and filed on Sep. 23, 2020, which is expressly incorporated by reference herein in its entirety.

TECHNICAL FIELD

The present disclosure relates generally to communication systems, and more particularly, to wireless communication systems with configured grant (CG) and dynamic grant (DG).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Methods, computer program products, and apparatuses for scheduling type indication are provided. In one aspect of the disclosure, a method, a computer-readable medium, and an apparatus are provided for wireless communication at a user equipment (UE). The UE transmits, to a base station, a scheduling request (SR) or a physical random access channel (PRACH) associated with a scheduling type indication that indicates a dynamic grant (DG) or a configured grant (CG). The UE may receive a response from the base station.

In another aspect of the disclosure, a method, a computer-readable medium, and an apparatus are provided for wireless communication at a base station. The base station receives, from a UE, an SR or a PRACH associated with a scheduling type indication that indicates a DG or a CG. The base station transmits a response to the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
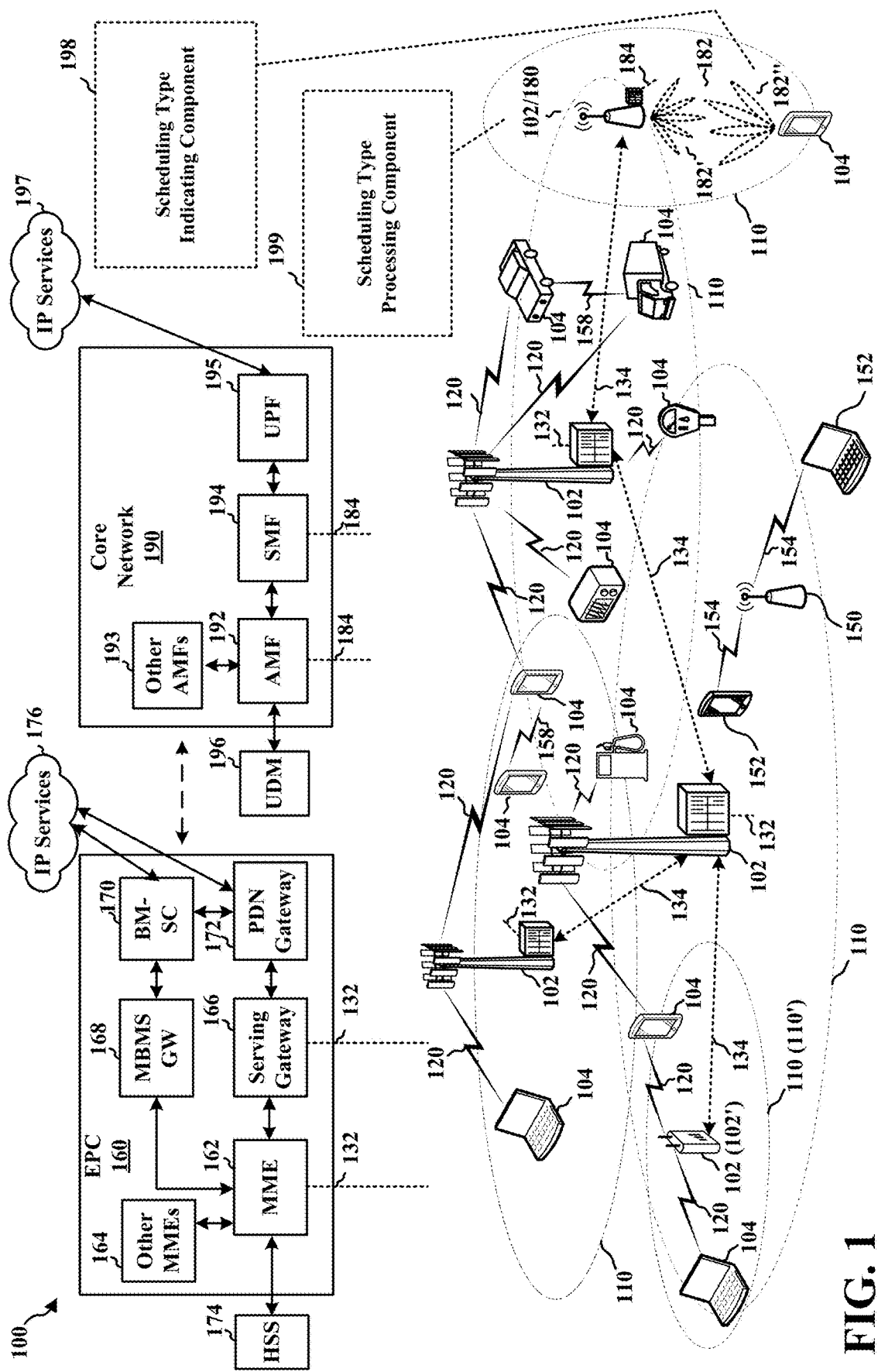
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a scheduling type indicating component 198. In some aspects, the scheduling type indicating component 198 may be configured to transmit, to a base station, a scheduling request (SR) or a physical random access channel (PRACH) associated with a scheduling type indication that indicates a DG or a CG. In some aspects, the scheduling type indicating component 198 may be configured to receive a response from the base station.

In certain aspects, the base station 180 may include a scheduling type processing component 199. In some aspects, the scheduling type processing component 199 may be configured to receive, from a UE, an SR or a PRACH associated with a scheduling type indication that indicates a DG or a CG. In some aspects, the scheduling type processing component 199 may be configured to transmit a response to the UE.

Although the following description may be focused on 5G NR, the concepts described herein may be applicable to other similar areas, such as LTE, LTE-A, CDMA, GSM, and other wireless technologies.

Figure 2:
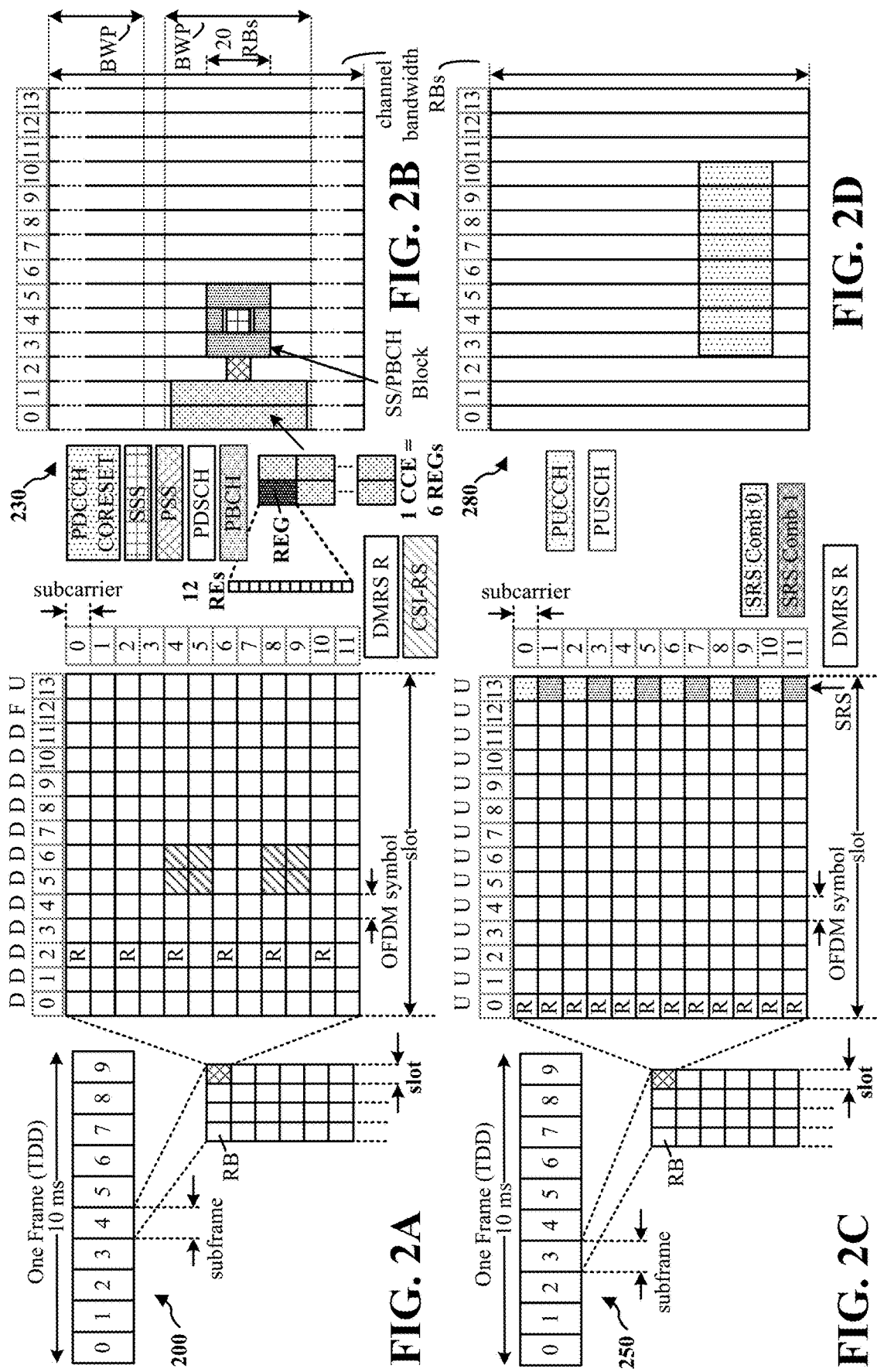
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS<br>Δf = $2^μ · 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^μ$ slots/subframe. The subcarrier spacing may be equal to $2^μ*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
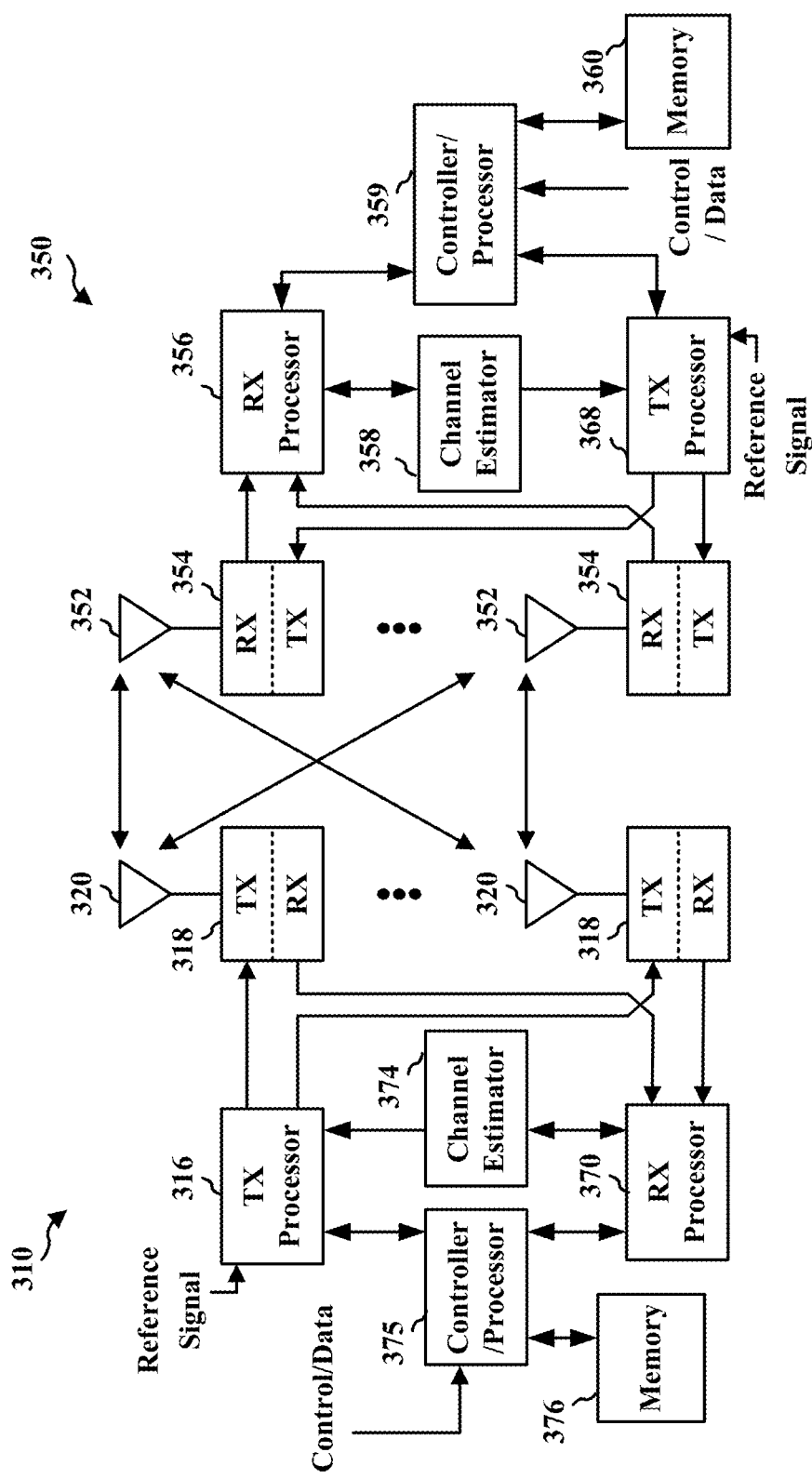
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with scheduling type indicating component 198 of FIG. 1.

At least one of the TX processor 316, the RX processor 370, and the controller/processor 375 may be configured to perform aspects in connection with scheduling type processing component 199 of FIG. 1.

Wireless communication may support higher capability devices as well as reduced capability devices. Among others, examples of higher capability devices may include premium smartphones, V2X devices, URLLC devices, eMBB devices, etc. Among other examples, reduced capability devices may include wearables, industrial wireless sensor networks (IWSN), surveillance cameras, low-end smartphones, etc. For example, NR communication systems may support both the higher capability devices and the reduced capability devices. A reduced capability device may be referred to as an NR light device, a low-tier device, a lower tier device, etc. Reduced capability UEs may communicate based on various types of wireless communication. For example, smart wearables may transmit or receive communication based on low power wide area (LPWA)/mMTC, relaxed IoT devices may transmit or receive communication based on URLLC, sensors/cameras may transmit or receive communication based on eMBB, etc.

In some examples, a reduced capability UE may have an uplink transmission power of at least 10 dB less than that a higher capability UE. As another example, a reduced capability UE may have reduced transmission bandwidth or reception bandwidth than other UEs. For instance, a reduced capability UE may have an operating bandwidth between 5 MHz and 20 MHz for both transmission and reception, in contrast to other UEs which may have a bandwidth of up to 100 MHz. As a further example, a reduced capability UE may have a reduced number of reception antennas in comparison to other UEs. For instance, a reduced capability UE may have only a single receive antenna and may experience a lower equivalent receive signal to noise ratio (SNR) in comparison to higher capability UEs that may have multiple antennas. Reduced capability UEs may also have reduced computational complexity than other UEs.

It may be helpful for communication to be scalable and deployable in a more efficient and cost-effective way. For example, it may be possible to relax or reduce peak throughput, latency, and/or reliability requirements for the reduced capability devices. In some examples, reductions in power consumption, complexity, production cost, and/or reductions in system overhead may be prioritized. As an example, industrial wireless sensors may have an acceptable up to approximately 100 ms. In some safety-related applications, the latency of industrial wireless sensors may be acceptable up to 10 ms or up to 5 ms. The data rate may be lower and may include more uplink traffic than downlink traffic. As another example, video surveillance devices may have an acceptable latency up to approximately 500 ms.

In wireless communication systems, a UE may request UL resources by sending an SR or PRACH to a base station. The base station may respond by sending a DCI message granting UL resources such as UL DG PUSCH. However, the UE may have a large amount of UL data that the UE may use multiple slots to be configured. For example, for reduced capability (which may be referred to as a "RedCap") UEs, the UE may have UL heavy use cases such as video surveillance cameras and industrial wireless sensors that may need to send bursts of UL data. For reduced capability UEs, a more efficient power and resource-efficient setting than transmitting a DCI command in every slot may be advantageous. In some aspects, the UE may request using an SR or PRACH to be able to send multiple messages without multiple grants, which may reduce monitoring at a reduced capability UE for control signaling with multiple grants.

Figure 4:
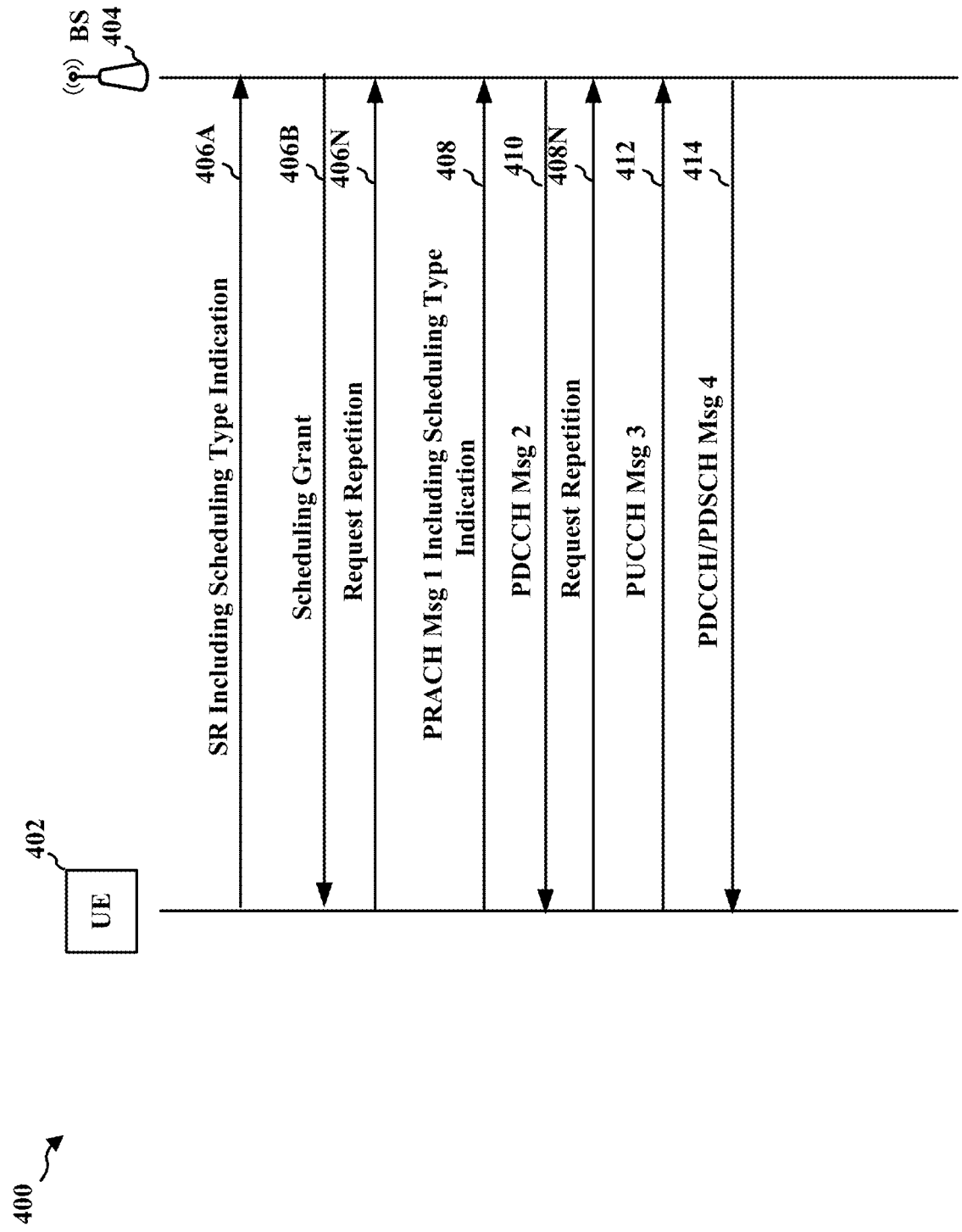
FIG. 4 illustrates an example communication between a base station and a UE.

FIG. 4 illustrates an example communication flow 400 that includes a UE 402 and a base station 404. The UE 402 may transmit an SR 406A with an indication indicating a requested/preferred scheduling type (DG or CG). In some aspects, the indication may be coded in the SR or information bits. In some aspects, the indication may be using configured/defined PUCCH resources for DG or CG. The indication may include one or more of a CG configuration index, a number of CG occasions or slots, one or more resource blocks for the DG or the CG, a modulation and coding scheme for the DG or the CG, a number of repetitions for the DG or the CG, a buffer status report (BSR), a power headroom report (PHR), or a spatial relation.

The base station 404 may transmit a scheduling grant 406B as a response to the UE 402. In some aspects, the scheduling grant may grant the requested CG or DG. In some aspects, the UE 402 may be configured to assume a default CG configuration is implicitly activated if the SR 406A is acknowledged. In some aspects, the UE 402 may have requested a CG and the response scheduling grant 406B may be DG. In some aspects, the UE 402 may assume that the CG request is denied and may stop sending further CG request repetitions and use the DG. In some aspects, the UE 402 may transmit request repetition 406N up to a number of configured maximum repetitions.

In some aspects, instead of an SR, the UE 402 may transmit a PRACH 408 with an indication indicating a requested/preferred scheduling type (DG or CG). The UE 402 may transmit the PRACH 408 on a RACH occasion (RO). In some aspects, the indication may be coded in the PRACH sequence or one or more information bits. In some aspects, the indication may be using configured/defined PRACH resources for DG or CG. The indication may include one or more of a CG configuration index, a number of CG occasions or slots, one or more resource blocks for the DG or the CG, a modulation and coding scheme for the DG or the CG, a number of repetitions for the DG or the CG, a BSR, a PHR, or a spatial relation.

The base station 404 may transmit a random access response (RAR) message that includes a PDCCH 410 as a response to the UE 402. In some aspects, the PDCCH 410 may grant the requested CG or DG. In some aspects, the UE 402 may be configured to assume a default CG configuration is implicitly activated if the PRACH 408 is acknowledged. In some aspects, the UE 402 may have requested a CG and the response PDCCH 410 in the RAR message may be DG. In some aspects, the UE 402 may assume that the CG request is denied and may stop sending further CG request repetitions and use the DG. In some aspects, the UE 402 may transmit request repetition 408N up to a number of configured maximum repetitions. In some aspects, the UE 402 may further transmit a PUCCH 412 to the base station 404 and receive a PDCCH/PDSCH 414 in response to the PUCCH 412.

Figure 5:
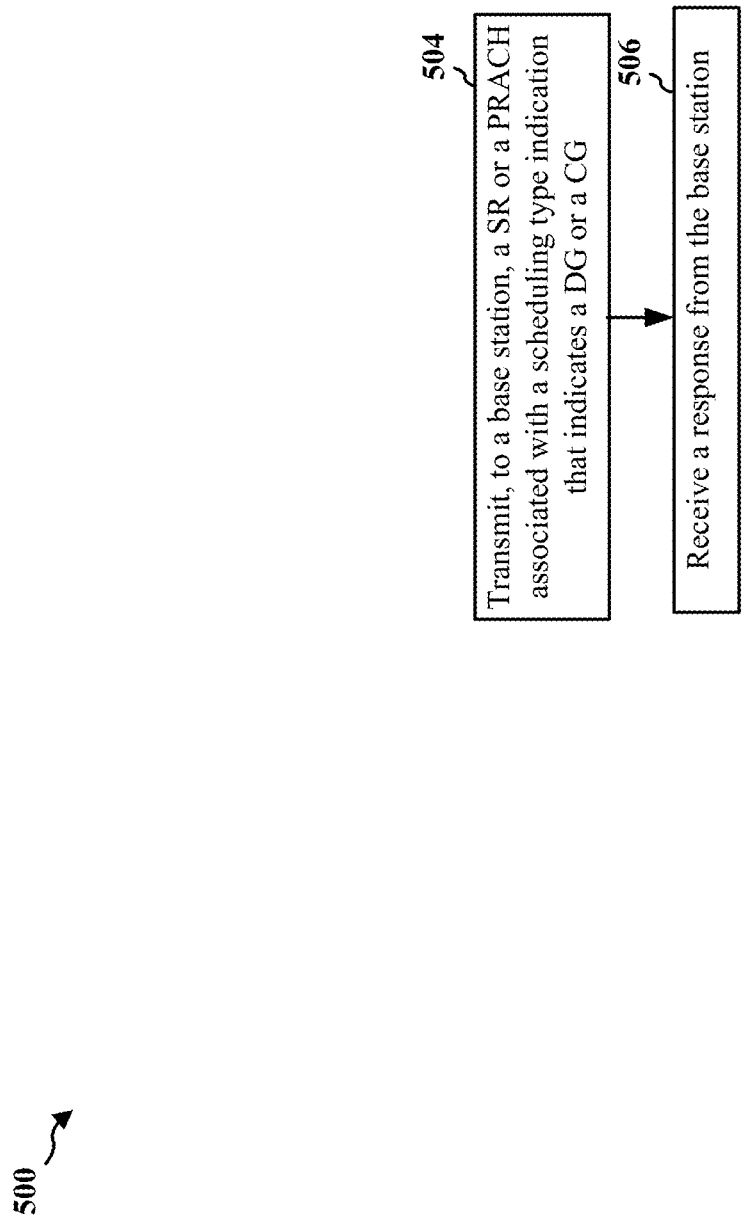
FIG. 5 is a flowchart of a method of wireless communication.

FIG. 5 is a flowchart 500 of a method of wireless communication. In some examples, the method may be performed by a UE (e.g., the UE 104, 350, 402; the apparatus 902). The method may help to provide an SR or a PRACH with an indication of scheduling type which may enable the UE to transmit multiple messages without multiple grants, thereby improving efficiency.

At 504, the UE transmits, to a base station, an SR or a PRACH associated with a scheduling type indication that indicates a DG or a CG. As one example, the UE 402 may transmit, to a base station 404, an SR (e.g., 406A) or a PRACH (e.g., 408) associated with a scheduling type indication that indicates a DG or a CG. For example, transmission 504 may be performed by an indication transmission component 944 in FIG. 9. In some aspects, the scheduling type indication further includes one or more of: a CG configuration index, a number of CG occasions or slots, one or more resource blocks for the DG or the CG, a modulation and coding scheme for the DG or the CG, a number of repetitions for the DG or the CG, a BSR, a PHR, or a spatial relation. In some aspects, the scheduling type indication is indicated by transmitting the SR or the PRACH in configured PUCCH resources or PRACH resources. In some aspects, the scheduling type indication is coded in one or more information bits. In some aspects, the scheduling type indication is coded in the SR or the PRACH.

At 506, the UE receives a response from the base station. For example, reception 506 may be performed by a response reception component 946 in FIG. 9. As one example, the UE 402 may receive a response from the base station 404, such as the scheduling grant 406B or the PDCCH 410. In some aspects, the response is an acknowledgment and a default CG configuration is activated based on the acknowledgment.

Figure 6:
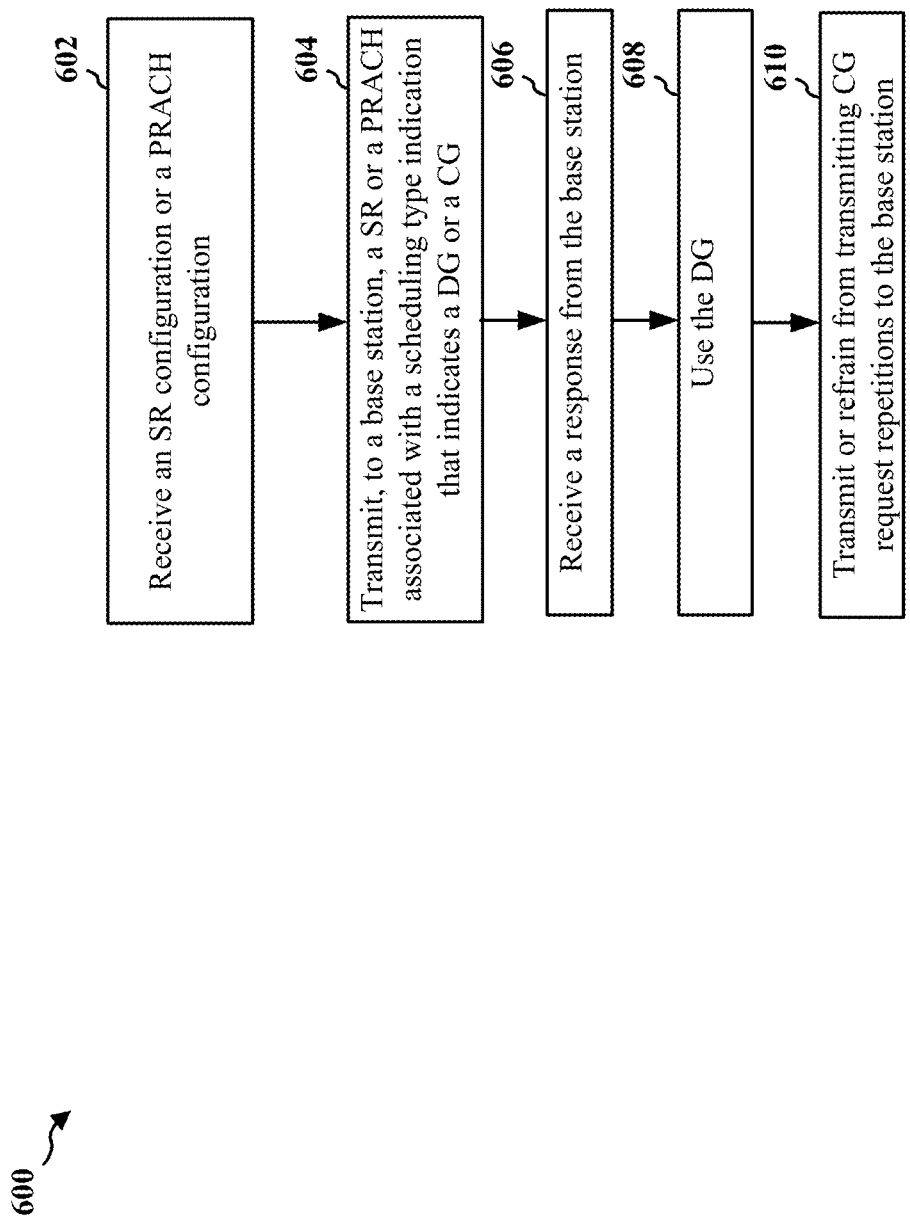
FIG. 6 is a flowchart of a method of wireless communication.

FIG. 6 is a flowchart 600 of a method of wireless communication. In some examples, the method may be performed by a UE (e.g., the UE 104, 350, 402; the apparatus 902). The method may help to provide an SR or a PRACH with an indication of scheduling type which may enable the UE to transmit multiple messages without multiple grants, thereby improving efficiency.

In some aspects, at 602, the UE receives an SR configuration or a PRACH configuration. As one example, the UE 402 may receive an SR configuration (e.g., SR configuration for SR 406A) or a PRACH configuration. For example, reception 602 may be performed by a configuration reception component 942 in FIG. 9. In some aspects, the SR or the PRACH associated with the scheduling type indication is based on the SR configuration or the PRACH configuration. In some aspects, the SR configuration or the PRACH configuration comprises a number of repetitions or a PRACH format.

At 604, the UE transmits, to a base station, an SR or a PRACH associated with a scheduling type indication that indicates a DG or a CG. As one example, the UE 402 may transmit, to a base station 404, an SR (e.g., 406A) or a PRACH (e.g., 408) associated with a scheduling type indication that indicates a DG or a CG. For example, transmission 604 may be performed by an indication transmission component 944 in FIG. 9. In some aspects, the scheduling type indication further includes one or more of: a CG configuration index, a number of CG occasions or slots, one or more resource blocks for the DG or the CG, a modulation and coding scheme for the DG or the CG, a number of repetitions for the DG or the CG, a BSR, a PHR, or a spatial relation. In some aspects, the scheduling type indication is indicated by transmitting the SR or the PRACH in configured PUCCH resources or PRACH resources. In some aspects, the scheduling type indication is coded in one or more information bits. In some aspects, the scheduling type indication is coded in the SR or the PRACH.

At 606, the UE receives a response from the base station. For example, reception 606 may be performed by a response reception component 946 in FIG. 9. As one example, the UE 402 may receive a response from the base station 404, such as the scheduling grant 406B or the PDCCH 410. In some aspects, the response is an acknowledgment and a default CG configuration is activated based on the acknowledgment.

In some aspects, the scheduling type indication indicates the CG and the response includes the DG for the UE. In some aspects, at 608, the UE uses the DG. For example, using 608 may be performed by a DG using component 948 in FIG. 9.

In some aspects where the UE uses the DG, at 610, the UE refrains from transmitting CG request repetitions to the base station. In some aspects, at 610, the UE transmits one or more additional CG requests to the base station. In some aspects, the UE stops sending the one or more additional CG requests if the UE has transmitted a number of CG requests that meets a CG request threshold. For example, transmission or refraining 610 may be performed by a CG request component 950 in FIG. 9.

Figure 7:
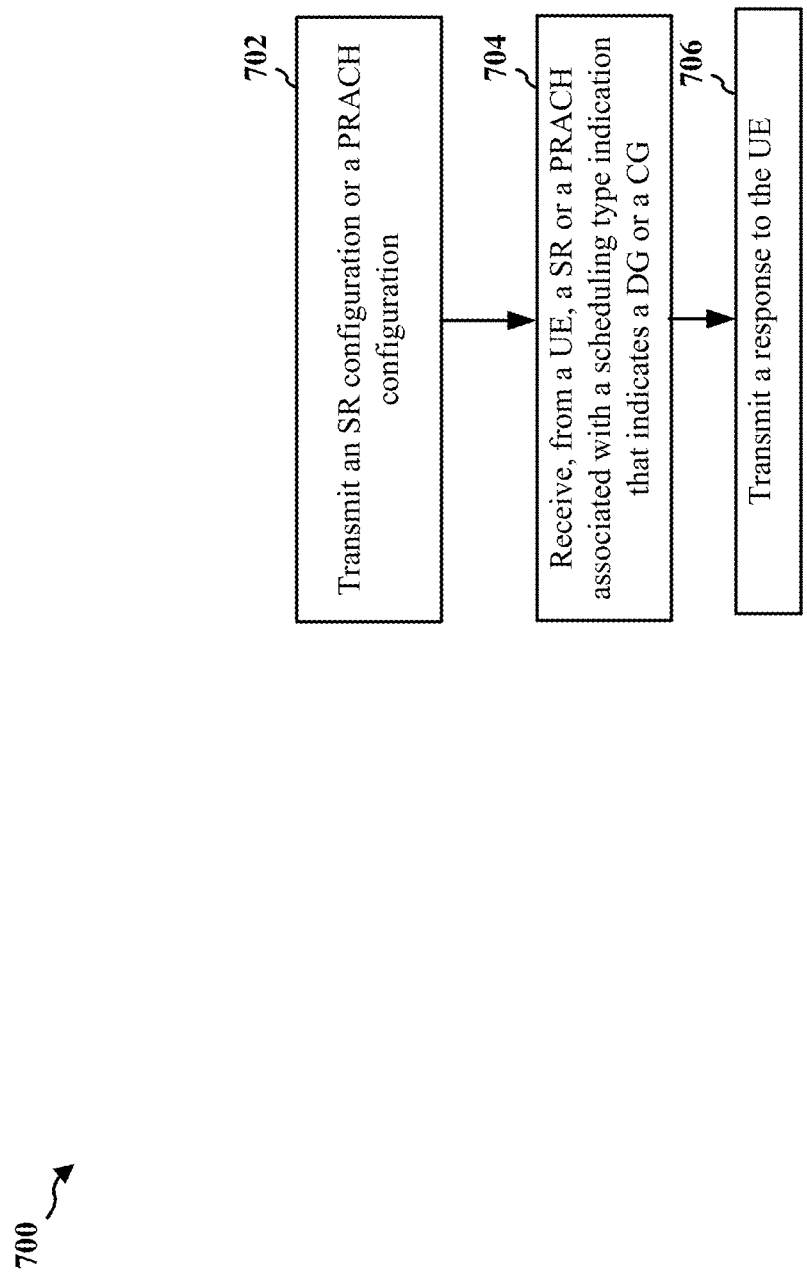
FIG. 7 is a flowchart of a method of wireless communication.

FIG. 7 is a flowchart 700 of a method of wireless communication. In some examples, the method may be performed by a base station (e.g., the base station 102/180, 310, 404; the apparatus 1002). The method may help a base station to process an SR or a PRACH with an indication of scheduling type which may enable the base station to receive multiple messages without multiple grants, thereby improving efficiency.

In some aspects, at 702, the base station transmits an SR configuration or a PRACH configuration. As one example, the base station 404 may transmit an SR configuration or a PRACH configuration. For example, transmission 702 may be performed by a configuration transmission component 1042 in FIG. 10. In some aspects, the SR or the PRACH associated with the scheduling type indication is based on the SR configuration or the PRACH configuration. In some aspects, the SR configuration or the PRACH configuration comprises a number of repetitions or a PRACH format.

At 704, the base station receives, from a UE, an SR or a PRACH associated with a scheduling type indication that indicates a DG or a CG. As one example, the base station 404 may receive from a UE 402, an SR or a PRACH (e.g., 406A, 408) associated with a scheduling type indication that indicates a DG or a CG. For example, reception 704 may be performed by an indication reception component 1044 in FIG. 10. In some aspects, the scheduling type indication further includes one or more of: a CG configuration index, a number of CG occasions or slots, one or more resource blocks for the DG or the CG, a modulation and coding scheme for the DG or the CG, a number of repetitions for the DG or the CG, a BSR, a PHR, or a spatial relation. In some aspects, the scheduling type indication is received by receiving the SR or the PRACH in configured PUCCH resources or PRACH resources. In some aspects, the scheduling type indication is coded in one or more information bits. In some aspects, the scheduling type indication is coded in the SR or the PRACH.

At 706, the base station transmits a response to the UE. As one example, the base station 404 may transmit a response (such as the scheduling grant 406B or the PDCCH 410) to the UE 402. For example, transmission 706 may be performed by a response transmission component 1046 in FIG. 10. In some aspects, the response is an acknowledgment and a default CG configuration is activated based on the acknowledgment.

Figure 8:
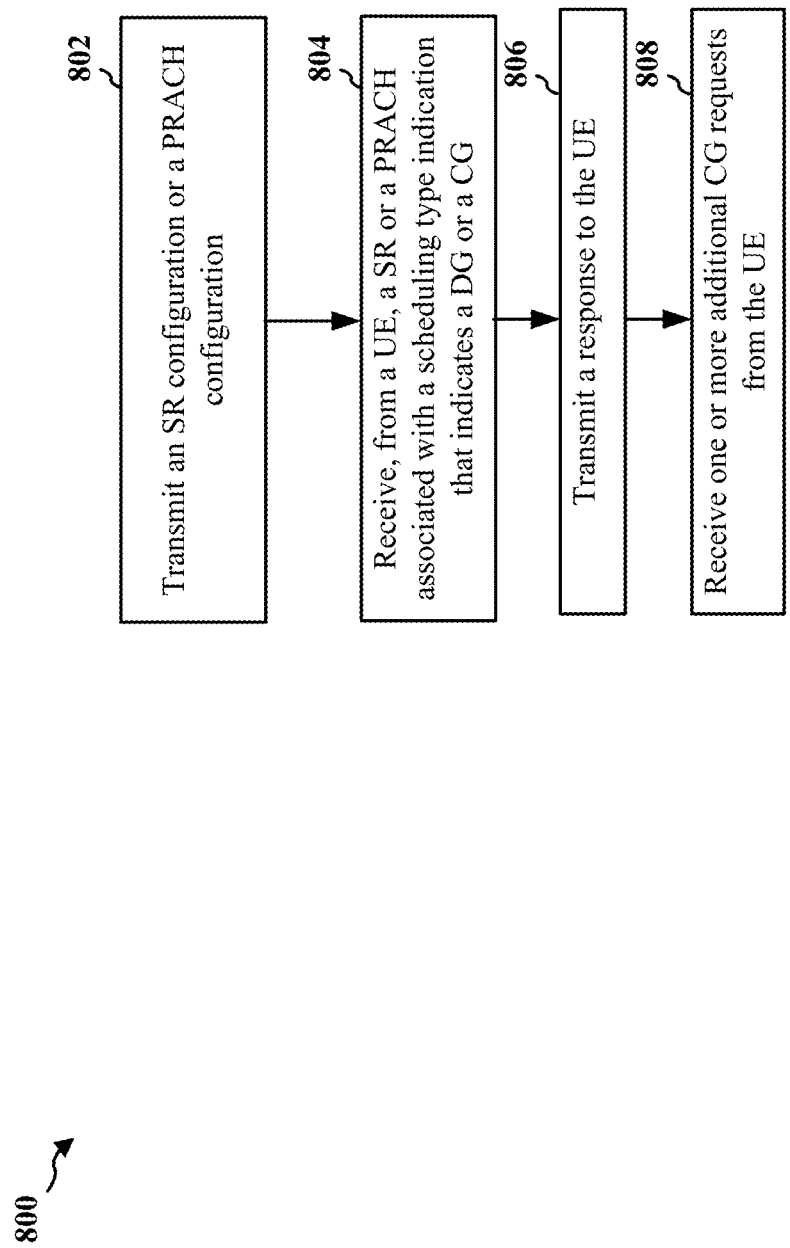
FIG. 8 is a flowchart of a method of wireless communication.

FIG. 8 is a flowchart 800 of a method of wireless communication. In some examples, the method may be performed by a base station (e.g., the base station 102/180, 310, 404; the apparatus 1002). The method may help a base station to process an SR or a PRACH with an indication of scheduling type which may enable the base station to receive multiple messages without multiple grants, thereby improving efficiency.

In some aspects, at 802, the base station transmits an SR configuration or a PRACH configuration. As one example, the base station 404 may transmit an SR configuration or a PRACH configuration. For example, transmission 802 may be performed by a configuration transmission component 1042 in FIG. 10. In some aspects, the SR or the PRACH associated with the scheduling type indication is based on the SR configuration or the PRACH configuration. In some aspects, the SR configuration or the PRACH configuration comprises a number of repetitions or a PRACH format.

At 804, the base station receives, from a UE, an SR or a PRACH associated with a scheduling type indication that indicates a DG or a CG. As one example, the base station 404 may receive from a UE 402, an SR or a PRACH (e.g., 406A, 408) associated with a scheduling type indication that indicates a DG or a CG. For example, reception 804 may be performed by an indication reception component 1044 in FIG. 10. In some aspects, the scheduling type indication further includes one or more of: a CG configuration index, a number of CG occasions or slots, one or more resource blocks for the DG or the CG, a modulation and coding scheme for the DG or the CG, a number of repetitions for the DG or the CG, a BSR, a PHR, or a spatial relation. In some aspects, the scheduling type indication is received by receiving the SR or the PRACH in configured PUCCH resources or PRACH resources. In some aspects, the scheduling type indication is coded in one or more information bits. In some aspects, the scheduling type indication is coded in the SR or the PRACH.

At 806, the base station transmits a response to the UE. As one example, the base station 404 may transmit a response (such as the scheduling grant 406B or the PDCCH 410) to the UE 402. For example, transmission 806 may be performed by a response transmission component 1046 in FIG. 10. In some aspects, the response is an acknowledgment and a default CG configuration is activated based on the acknowledgment.

In some aspects, the scheduling type indication indicates the CG and the response includes the DG for the UE. In some aspects, at 808, the base station receives one or more additional CG requests from the UE. For example, reception 808 may be performed by a CG request processing component 1048 in FIG. 10.

Figure 9:
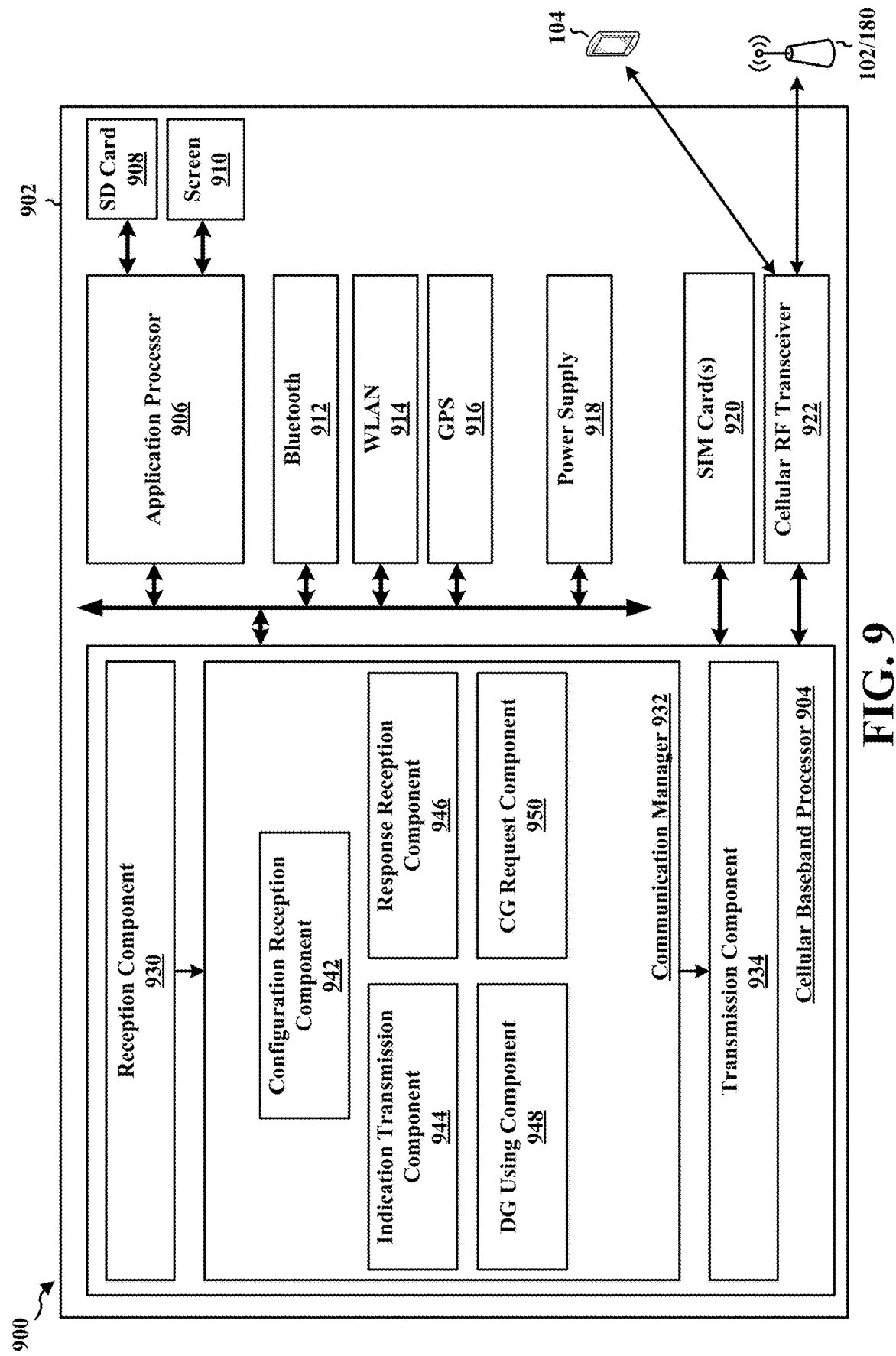
FIG. 9 is a diagram illustrating an example of a hardware implementation for an example apparatus.

FIG. 9 is a diagram 900 illustrating an example of a hardware implementation for an apparatus 902. The apparatus 902 may be a UE, a component of a UE, or may implement UE functionality. In some aspects, the apparatus 902 includes a cellular baseband processor 904 (also referred to as a modem) coupled to a cellular RF transceiver 922 and one or more antennas. In some aspects, the apparatus 902 may further include one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, and/or a power supply 918. The cellular baseband processor 904 communicates through the cellular RF transceiver 922 with the UE 104 and/or BS 102/180. The cellular baseband processor 904 may include a computer-readable medium/memory. The computer-readable medium/memory may be non-transitory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 350 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire UE (e.g., see 350 of FIG. 3) and include the additional modules of the apparatus 902.

The communication manager 932 includes a configuration reception component 942 that is configured to receive an SR configuration or a PRACH configuration, e.g., as described in connection with 602 in FIG. 6. The communication manager 932 further includes an indication transmission component 944 that is configured to transmit, to a base station, an SR or a PRACH associated with a scheduling type indication that indicates a DG or a CG, e.g., as described in connection with 504 in FIG. 5, or 604 in FIG. 6. The communication manager 932 further includes a response reception component 946 that is configured to receive a response from the base station, e.g., as described in connection with 506 in FIG. 5, or 606 in FIG. 6. The communication manager 932 further includes a DG using component 948 that is configured to use the DG, e.g., as described in connection with 608 in FIG. 6. The communication manager 932 further includes a CG request component 950 that is configured to transmit one or more additional CG requests to the base station or refrain from transmitting CG request repetitions to the base station, e.g., as described in connection with 610 in FIG. 6.

The apparatus may include additional components that perform each of the blocks of the algorithm in the flowcharts of FIGS. 5-6 As such, each block in the flowcharts of FIGS. 5-6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 902 may include a variety of components configured for various functions. In one configuration, the apparatus 902, and in particular the cellular baseband processor 904, includes means for transmitting, to a base station, an SR or a PRACH associated with a scheduling type indication that indicates a DG or a CG. In some aspects, the cellular baseband processor 904 further includes means for receiving a response from the base station. In some aspects, the cellular baseband processor 904 further includes means for receiving an SR configuration or a PRACH configuration. In some aspects, the cellular baseband processor 904 further includes means for using the DG. In some aspects, the cellular baseband processor 904 further includes means for refraining from transmitting CG request repetitions to the base station. In some aspects, the cellular baseband processor 904 further includes means for transmitting one or more additional CG requests to the base station. The means may be one or more of the components of the apparatus 902 configured to perform the functions recited by the means. As described supra, the apparatus 902 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 10:
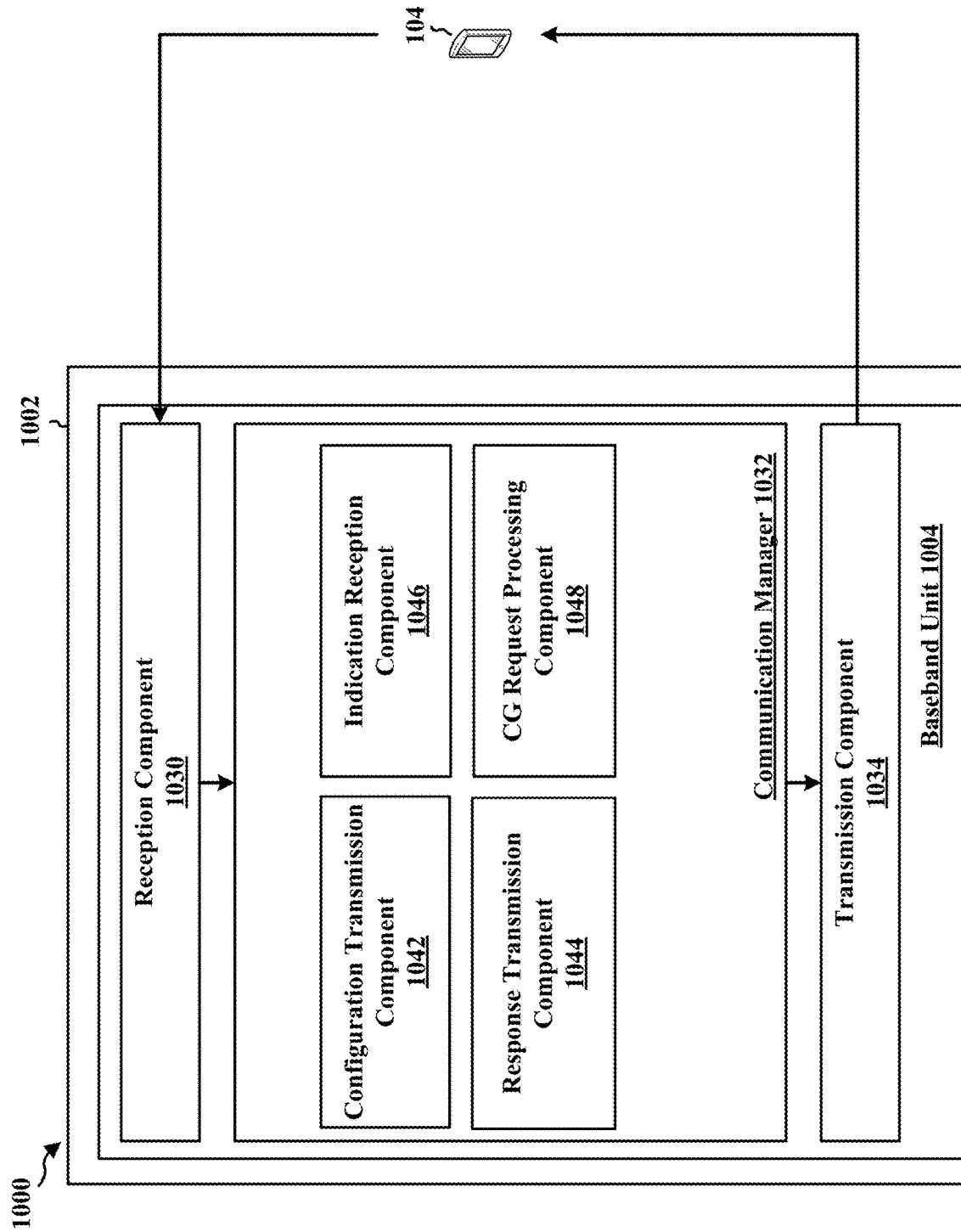
FIG. 10 is a diagram illustrating an example of a hardware implementation for an example apparatus.

FIG. 10 is a diagram 1000 illustrating an example of a hardware implementation for an apparatus 1002. The apparatus 1002 may be a base station, a component of a base station, or may implement UE functionality. In some aspects, the apparatus further includes a baseband unit 1004. The baseband unit 1004 may communicate through a cellular RF transceiver and at least one antenna with the UE 104. The baseband unit 1004 may include a computer-readable medium/memory. The baseband unit 1004 is responsible for general processing, including the execution of software stored on the computer-readable medium/memory. The software, when executed by the baseband unit 1004, causes the baseband unit 1004 to perform the various functions described supra. The computer-readable medium/ memory may also be used for storing data that is manipulated by the baseband unit 1004 when executing software. The baseband unit 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband unit 1004. The baseband unit 1004 may be a component of the base station 310 and may include the memory 376 and/or at least one of the TX processor 316, the RX processor 370, and the controller/processor 375.

The communication manager 1032 includes a configuration transmission component 1042 that is configured to transmit an SR configuration or a PRACH configuration, e.g., as described in connection with 702 in FIG. 7, or 802 in FIG. 8. The communication manager 1032 further includes an indication reception component 1044 that is configured to receive, from a UE, an SR or a PRACH associated with a scheduling type indication that indicates a DG or a CG, e.g., as described in connection with 704 in FIG. 7, or 804 in FIG. 8. The communication manager 1032 further includes a response transmission component 1046 that is configured to transmit a response to the UE, e.g., as described in connection with 706 in FIG. 7, or 806 in FIG. 6. The communication manager 1032 further includes a CG request processing component 1048 that is configured to receive one or more additional CG requests from the UE, e.g., as described in connection with 808 in FIG. 6.

The apparatus may include additional components that perform each of the blocks of the algorithm in the flowcharts of FIGS. 7-8. As such, each block in the flowcharts of FIGS. 7-8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1002 may include a variety of components configured for various functions. In one configuration, the apparatus 1002, and in particular the baseband unit 1004, includes means for receiving, from a UE, an SR or a PRACH associated with a scheduling type indication that indicates a DG or a CG. In some aspects, the baseband unit 1004 further includes means for transmitting a response to the UE. In some aspects, the baseband unit 1004 further includes means for transmitting an SR configuration or a PRACH configuration. In some aspects, the baseband unit 1004 further includes means for receiving one or more additional CG requests from the UE. The means may be one or more of the components of the apparatus 1002 configured to perform the functions recited by the means. As described supra, the apparatus 1002 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Aspect 1 is an apparatus for wireless communication of a UE, comprising: a memory; and at least one processor coupled to the memory and configured to: transmit, to a base station, a SR or a PRACH associated with a scheduling type indication that indicates a DG or a CG; and receive a response from the base station.

Aspect 2 is the apparatus of aspect 1, wherein the scheduling type indication is coded in the SR or the PRACH.

Aspect 3 is the apparatus of any of aspects 1-2, wherein the scheduling type indication is coded in one or more information bits.

Aspect 4 is the apparatus of any of aspects 1-3, wherein the scheduling type indication is indicated by transmitting the SR or the PRACH in configured PUCCH resources or PRACH resources.

Aspect 5 is the apparatus of any of aspects 1-4, wherein the scheduling type indication further includes one or more of: a CG configuration index, a number of CG occasions or slots, one or more resource blocks for the DG or the CG, a modulation and coding scheme for the DG or the CG, a number of repetitions for the DG or the CG, a BSR, a PHR, or a spatial relation.

Aspect 6 is the apparatus of any of aspects 1-5, wherein the at least one processor is further configured to: receive an SR configuration or a PRACH configuration, wherein the SR or the PRACH associated with the scheduling type indication is based on the SR configuration or the PRACH configuration.

Aspect 7 is the apparatus of any of aspects 1-6, wherein the SR configuration or the PRACH configuration comprises a number of repetitions or a PRACH format.

Aspect 8 is the apparatus of any of aspects 1-7, wherein the response is an acknowledgment, and wherein a default CG configuration is activated based on the acknowledgment.

Aspect 9 is the apparatus of any of aspects 1-8, wherein the scheduling type indication indicates the CG and the response includes the DG for the UE, wherein the at least one processor is further configured to: use the DG; and refrain from transmitting CG request repetitions to the base station.

Aspect 10 is the apparatus of any of aspects 1-9, wherein the scheduling type indication indicates the CG and the response includes the DG for the UE, wherein the at least one processor is further configured to: transmit one or more additional CG requests to the base station.

Aspect 11 is the apparatus of any of aspects 1-10, wherein the UE stops sending the one or more additional CG requests if the UE has transmitted a number of CG requests that meets a CG request threshold.

Aspect 12 is the apparatus of any of aspects 1-11, further comprising a transceiver coupled to the at least one processor.

Aspect 13 is an apparatus for wireless communication of a base station, comprising: a memory; and at least one processor coupled to the memory and configured to: receive, from a UE, a SR or a PRACH associated with a scheduling type indication that indicates a DG or a CG; and transmit a response to the UE.

Aspect 14 is the apparatus of aspect 13, wherein the scheduling type indication is coded in the SR or the PRACH.

Aspect 15 is the apparatus of any of aspects 13-14, wherein the scheduling type indication is coded in one or more information bits.

Aspect 16 is the apparatus of any of aspects 13-15, wherein the scheduling type indication is received by receiving the SR or the PRACH in configured PUCCH resources or PRACH resources.

Aspect 17 is the apparatus of any of aspects 13-16, wherein the scheduling type indication further includes one or more of: a CG configuration index, a number of CG occasions or slots, one or more resource blocks for the DG or the CG, a modulation and coding scheme for the DG or the CG, a number of repetitions for the DG or the CG, a BSR, a PHR, or a spatial relation.

Aspect 18 is the apparatus of any of aspects 13-17, wherein the at least one processor is further configured to: transmit an SR configuration or a PRACH configuration, wherein the SR or the PRACH associated with the scheduling type indication is based on the SR configuration or the PRACH configuration.

Aspect 19 is the apparatus of any of aspects 13-18, wherein the SR configuration or the PRACH configuration comprises a number of repetitions or a PRACH format.

Aspect 20 is the apparatus of any of aspects 13-19, wherein the response is an acknowledgment, and wherein a default CG configuration is activated based on the acknowledgment.

Aspect 21 is the apparatus of any of aspects 13-20, wherein the scheduling type indication indicates the CG and the response includes the DG for the UE, wherein the at least one processor is further configured to: receiving one or more additional CG requests from the UE.

Aspect 22 is the apparatus of any of aspects 13-21, further comprising a transceiver coupled to the at least one processor.

Aspect 23 is a method of wireless communication for implementing any of aspects 1 to 12.

Aspect 24 is an apparatus for wireless communication including means for implementing any of aspects 1 to 12.

Aspect 25 is a computer-readable medium storing computer executable code, where the code when executed by a processor causes the processor to implement any of aspects 1 to 12.

Aspect 26 is a method of wireless communication for implementing any of aspects 13 to 22.

Aspect 27 is an apparatus for wireless communication including means for implementing any of aspects 13 to 22.

Aspect 28 is a computer-readable medium storing computer executable code, where the code when executed by a processor causes the processor to implement any of aspects 13 to 22.

What is claimed is:

1. An apparatus for wireless communication of a user equipment (UE), comprising:
   a memory; and
   at least one processor coupled to the memory and configured to:
   transmit, to a base station, a scheduling request (SR) or a physical random access channel (PRACH) associated with a scheduling type indication that indicates a dynamic grant (DG) or a configured grant (CG); and
   receive a response from the base station, wherein the response is an acknowledgment, and wherein a default CG configuration is activated based on the acknowledgment.

2. The apparatus of claim 1, wherein the scheduling type indication is coded in the SR or the PRACH.

3. The apparatus of claim 1, wherein the scheduling type indication is coded in one or more information bits.

4. The apparatus of claim 3, wherein the scheduling type indication is indicated by transmitting the SR or the PRACH in configured physical uplink control channel (PUCCH) resources or PRACH resources.

5. The apparatus of claim 1, wherein the scheduling type indication further includes one or more of:
   a CG configuration index,
   a number of CG occasions or slots,
   one or more resource blocks for the DG or the CG,
   a modulation and coding scheme for the DG or the CG,
   a number of repetitions for the DG or the CG,
   a buffer status report (BSR),
   a power headroom report (PHR), or
   a spatial relation.

6. The apparatus of claim 1, wherein the at least one processor is further configured to:
   receive an SR configuration or a PRACH configuration, wherein the SR or the PRACH associated with the scheduling type indication is based on the SR configuration or the PRACH configuration.

7. The apparatus of claim 6, wherein the SR configuration or the PRACH configuration comprises a number of repetitions or a PRACH format.

8. The apparatus of claim 1, further comprising a transceiver coupled to the at least one processor.

9. The apparatus of claim 1, wherein the at least one processor is configured to transmit the SR that comprises a request for uplink resources for the UE to transmit uplink data to the base station.

10. The apparatus of claim 1, wherein the at least one processor is configured to transmit the PRACH associated with the scheduling type indication that indicates the DG or the CG.

11. An apparatus for wireless communication of a user equipment (UE), comprising:
a memory; and
at least one processor coupled to the memory and configured to:
transmit, to a base station, a scheduling request (SR) or a physical random access channel (PRACH) associated with a scheduling type indication that indicates a dynamic grant (DG) or a configured grant (CG);
receive a response from the base station; wherein the scheduling type indication indicates the CG and the response includes the DG for the UE;
use the DG; and
refrain from transmitting CG request repetitions to the base station.

12. An apparatus for wireless communication of a user equipment (UE), comprising:
a memory; and
at least one processor coupled to the memory and configured to:
transmit, to a base station, a scheduling request (SR) or a physical random access channel (PRACH) associated with a scheduling type indication that indicates a dynamic grant (DG) or a configured grant (CG);
receive a response from the base station, wherein the scheduling type indication indicates the CG and the response includes the DG for the UE; and
transmit one or more additional CG requests to the base station.

13. The apparatus of claim 12, wherein the at least one processor is configured to stop sending the one or more additional CG requests if the UE has transmitted a number of CG requests that meets a CG request threshold.

14. An apparatus for wireless communication of a base station, comprising:
a memory; and
at least one processor coupled to the memory and configured to:
receive, from a user equipment (UE), a scheduling request (SR) or a physical random access channel (PRACH) associated with a scheduling type indication that indicates a dynamic grant (DG) or a configured grant (CG); and
transmit a response to the UE, wherein the response is an acknowledgment, and wherein a default CG configuration is activated based on the acknowledgment.

15. The apparatus of claim 14, wherein the scheduling type indication is coded in the SR or the PRACH.

16. The apparatus of claim 14, wherein the scheduling type indication is coded in one or more information bits.

17. The apparatus of claim 14, wherein the scheduling type indication is received by receiving the SR or the PRACH in configured physical uplink control channel (PUCCH) resources or PRACH resources.

18. The apparatus of claim 14, wherein the scheduling type indication further includes one or more of:
a CG configuration index,
a number of CG occasions or slots,
one or more resource blocks for the DG or the CG,
a modulation and coding scheme for the DG or the CG,
a number of repetitions for the DG or the CG,
a buffer status report (BSR),
a power headroom report (PHR), or
a spatial relation.

19. The apparatus of claim 14, wherein the at least one processor is further configured to:
transmit an SR configuration or a PRACH configuration, wherein the SR or the PRACH associated with the scheduling type indication is based on the SR configuration or the PRACH configuration.

20. The apparatus of claim 19, wherein the SR configuration or the PRACH configuration comprises a number of repetitions or a PRACH format.

21. The apparatus of claim 14, further comprising a transceiver coupled to the at least one processor.

22. The apparatus of claim 14, wherein the at least one processor is configured to receive the SR that comprises a request for uplink resources for the UE to transmit uplink data to the base station.

23. The apparatus of claim 14, wherein the at least one processor is configured to receive the PRACH associated with the scheduling type indication that indicates the DG or the CG.

24. An apparatus for wireless communication of a base station, comprising:
a memory; and
at least one processor coupled to the memory and configured to:
receive, from a user equipment (UE), a scheduling request (SR) or a physical random access channel (PRACH) associated with a scheduling type indication that indicates a dynamic grant (DG) or a configured grant (CG);
transmit a response to the UE, wherein the scheduling type indication indicates the CG and the response includes the DG for the UE; and
receive one or more additional CG requests from the UE.

25. A method of wireless communication of a user equipment (UE), comprising:
transmitting, to a base station, a scheduling request (SR) or a physical random access channel (PRACH) associated with a scheduling type indication that indicates a dynamic grant (DG) or a configured grant (CG); and
receiving a response from the base station, wherein the response is an acknowledgment, and wherein a default CG configuration is activated based on the acknowledgment.

26. The method of claim 25, wherein the scheduling type indication is coded in the SR or the PRACH.

27. The method of claim 25, wherein the scheduling type indication is coded in one or more information bits.

28. The method of claim 27, wherein the scheduling type indication is indicated by transmitting the SR or the PRACH in configured physical uplink control channel (PUCCH) resources or PRACH resources.

29. The method of claim 25, wherein the scheduling type indication further includes one or more of:
a CG configuration index,
a number of CG occasions or slots,
one or more resource blocks for the DG or the CG, a modulation and coding scheme for the DG or the CG,
a number of repetitions for the DG or the CG,
a buffer status report (BSR),
a power headroom report (PHR), or
a spatial relation.

30. The method of claim 25, further comprising:
receiving an SR configuration or a PRACH configuration, wherein the SR or the PRACH associated with the scheduling type indication is based on the SR configuration or the PRACH configuration.

31. The method of claim 30, wherein the SR configuration or the PRACH configuration comprises a number of repetitions or a PRACH format.

32. The method of claim 25, wherein the UE transmits the SR that comprises a request for uplink resources for the UE to transmit uplink data to the base station.

33. The method of claim 25, wherein the UE transmits the PRACH associated with the scheduling type indication that indicates the DG or the CG.

34. A method of wireless communication of a base station, comprising:
receiving, from a user equipment (UE), a scheduling request (SR) or a physical random access channel (PRACH) associated with a scheduling type indication that indicates a dynamic grant (DG) or a configured grant (CG); and
transmitting a response to the UE, wherein the response is an acknowledgment, and wherein a default CG configuration is activated based on the acknowledgment.

35. The method of claim 34, wherein the base station receives the SR that comprises a request for uplink resources for the UE to transmit uplink data to the base station.

36. The method of claim 34, wherein the base station receives the PRACH associated with the scheduling type indication that indicates the DG or the CG.

* * * * *